United States Patent
Sah et al.

(10) Patent No.: US 7,706,949 B2
(45) Date of Patent: Apr. 27, 2010

(54) METHOD AND APPARATUS TO CONTROL AN ELECTRO-MECHANICAL TRANSMISSION DURING SHIFTING EVENT

(75) Inventors: Jy-Jen F. Sah, West Bloomfield, MI (US); Anthony H. Heap, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 303 days.

(21) Appl. No.: 11/420,257

(22) Filed: May 25, 2006

(65) Prior Publication Data

US 2007/0276569 A1 Nov. 29, 2007

(51) Int. Cl.
G06F 1/00 (2006.01)
G06F 17/00 (2006.01)

(52) U.S. Cl. .............................. 701/51; 701/54; 701/55; 701/66; 701/67; 701/70; 477/31; 477/37; 477/68; 477/77; 477/79; 477/80; 477/86; 477/108; 477/109; 477/123; 477/124; 477/154; 477/175; 477/176; 475/2; 475/3; 475/5; 475/65; 475/76; 475/149; 475/198; 192/3.21; 192/3.51; 192/3.55; 74/330; 74/335; 903/918; 903/945

(58) Field of Classification Search ................... 701/51, 701/67, 21, 54, 55, 66, 70; 192/3.51, 103, 192/3.21, 3.55; 477/3, 37, 44, 31, 68, 77, 477/79, 80, 86, 108, 109, 123, 124, 154, 477/175, 176; 475/2, 3, 5, 65, 76, 149, 198; 74/330, 335; 903/918, 945

See application file for complete search history.

(56) References Cited

U.S. PATENT DOCUMENTS

| | | | |
|---|---|---|---|
| 3,508,450 A * | 4/1970 | Richards ...................... 74/340 |
| 4,388,977 A * | 6/1983 | Bader ........................ 180/165 |
| 4,527,678 A * | 7/1985 | Pierce et al. ............... 192/3.58 |
| 4,588,040 A * | 5/1986 | Albright et al. ............ 180/165 |
| 4,792,902 A * | 12/1988 | Hrovat et al. ............... 701/105 |
| 5,070,747 A * | 12/1991 | Lentz et al. ................. 477/149 |
| 5,072,390 A * | 12/1991 | Lentz et al. .................. 701/60 |
| 5,109,967 A * | 5/1992 | Saitou et al. ................. 192/76 |
| 5,211,079 A * | 5/1993 | Runde et al. ................ 477/61 |
| 5,342,258 A * | 8/1994 | Egyed ........................ 475/281 |
| 5,419,128 A * | 5/1995 | Asano et al. ................. 60/327 |
| 5,558,588 A * | 9/1996 | Schmidt ........................ 475/5 |
| 5,558,589 A * | 9/1996 | Schmidt ........................ 475/5 |
| 5,558,595 A * | 9/1996 | Schmidt et al. ............... 477/3 |
| 5,571,058 A * | 11/1996 | Schmidt ........................ 475/5 |
| 5,580,332 A * | 12/1996 | Mitchell et al. ............ 477/143 |
| 5,609,067 A * | 3/1997 | Mitchell et al. .......... 74/336 R |
| 5,730,676 A * | 3/1998 | Schmidt ........................ 475/5 |

(Continued)

*Primary Examiner*—Khoi Tran
*Assistant Examiner*—Jorge O Peche (57) ABSTRACT

A method and system for executing a shift from a first fixed gear to a second fixed gear in a powertrain system comprising a two-mode, compound-split, electro-mechanical transmission operative to receive a speed input from an engine is described. It includes deactivating an off-going clutch, and generating a time-based profile for rotational speed of an oncoming clutch. The input speed is controlled based upon the rotational speed of the oncoming clutch and an output of the transmission. The oncoming clutch is actuated, preferably when the input speed is synchronized with a rotational speed of an output shaft of the transmission multiplied by a gear ratio of the second fixed gear, preferably after a predetermined elapsed period of time in the range of 500 milliseconds.

7 Claims, 3 Drawing Sheets

U.S. PATENT DOCUMENTS

| | | | |
|---|---|---|---|
| 5,833,570 A * | 11/1998 | Tabata et al. | 477/3 |
| 5,856,709 A * | 1/1999 | Ibaraki et al. | 290/45 |
| 5,931,757 A * | 8/1999 | Schmidt | 475/2 |
| 5,935,035 A * | 8/1999 | Schmidt | 475/5 |
| 5,979,257 A * | 11/1999 | Lawrie | 74/335 |
| 5,993,350 A * | 11/1999 | Lawrie et al. | 477/5 |
| 6,090,005 A * | 7/2000 | Schmidt et al. | 475/5 |
| 6,176,808 B1 * | 1/2001 | Brown et al. | 477/5 |
| 6,358,173 B1 * | 3/2002 | Klemen et al. | 475/5 |
| 6,377,883 B1 * | 4/2002 | Shimabukuro et al. | 701/51 |
| 6,445,991 B1 * | 9/2002 | Dobele et al. | 701/67 |
| 6,491,599 B1 * | 12/2002 | Schmidt | 475/5 |
| 6,551,208 B1 * | 4/2003 | Holmes et al. | 475/5 |
| 6,558,283 B1 * | 5/2003 | Schnelle | 475/5 |
| 6,711,486 B1 * | 3/2004 | Karlsson et al. | 701/67 |
| 6,751,960 B2 * | 6/2004 | Arimitsu et al. | 60/706 |
| 6,811,508 B2 * | 11/2004 | Tumback | 475/5 |
| 6,832,978 B2 * | 12/2004 | Buchanan et al. | 477/174 |
| 6,887,184 B2 * | 5/2005 | Buchanan et al. | 477/174 |
| 6,909,955 B2 * | 6/2005 | Vukovich et al. | 701/51 |
| 6,915,782 B2 * | 7/2005 | Hanada et al. | 123/399 |
| 6,953,409 B2 * | 10/2005 | Schmidt et al. | 475/5 |
| 7,130,733 B2 * | 10/2006 | Mussaeus et al. | 701/55 |
| 7,130,734 B2 * | 10/2006 | Sah et al. | 701/67 |
| 7,356,398 B2 * | 4/2008 | Steinmetz et al. | 701/55 |
| 2003/0100395 A1 * | 5/2003 | Hiraiwa | 475/5 |
| 2004/0172184 A1 * | 9/2004 | Vukovich et al. | 701/51 |
| 2004/0266584 A1 * | 12/2004 | Janson et al. | 477/79 |
| 2005/0080535 A1 * | 4/2005 | Steinmetz et al. | 701/51 |
| 2005/0080540 A1 * | 4/2005 | Steinmetz et al. | 701/55 |
| 2005/0125134 A1 * | 6/2005 | Iwatsuki et al. | 701/70 |
| 2005/0137042 A1 * | 6/2005 | Schmidt et al. | 475/5 |
| 2005/0228567 A1 * | 10/2005 | Mussaeus et al. | 701/55 |
| 2005/0256625 A1 * | 11/2005 | Sah et al. | 701/67 |
| 2006/0100060 A1 * | 5/2006 | Kraska et al. | 477/156 |
| 2008/0033620 A1 * | 2/2008 | Kamichi et al. | 701/59 |
| 2009/0037061 A1 * | 2/2009 | Tabata et al. | 701/55 |

* cited by examiner

METHOD AND APPARATUS TO CONTROL AN ELECTRO-MECHANICAL TRANSMISSION DURING SHIFTING EVENT

TECHNICAL FIELD

This invention pertains generally to control systems for powertrain systems comprising electro-mechanical transmissions, and more specifically to control during transmission shifts.

BACKGROUND OF THE INVENTION

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

Engineers implementing powertrain systems having electro-mechanical transmissions are tasked with developing shifting schemes between various operating modes, including fixed gear modes and continuously variable modes. During execution of a shift into a fixed gear mode, there can be a change in operating conditions which can affect actuation of an oncoming clutch and associated driveline dynamics.

Therefore, there is a need to for a method and apparatus to control operation of a hybrid transmission during gear shifting events, to address concerns mentioned hereinabove.

SUMMARY OF THE INVENTION

In order to address the concerns raised hereinabove, an article of manufacture is provided to effect a method to control operation of a transmission device of an exemplary powertrain during execution of a shift.

In accordance with an embodiment of the present invention, a method is presented for executing a shift from a first fixed gear to a second fixed gear in a powertrain system comprising a two-mode, compound-split, electro-mechanical transmission operative to receive a speed input from an engine. The method comprises deactivating an off-going clutch, and generating a time-based profile for rotational speed of an oncoming clutch. The speed input from the engine is controlled based upon the time-based profile for rotational speed of the oncoming clutch and an output of the transmission. The oncoming clutch is actuated, preferably when the speed input from the engine is effective to substantially synchronize the speed of the oncoming clutch with a rotational speed of an output shaft of the transmission multiplied by a gear ratio of the second fixed gear, preferably after a predetermined elapsed period of time in the range of 500 milliseconds.

In accordance with an aspect of the invention, there is provided an article of manufacture, comprising a storage medium having a computer program encoded therein for effecting a method to selectively actuate a plurality of torque-transfer devices of a transmission device operative to receive torque inputs from a plurality of devices and operative to generate an output torque. The method comprises executing a shift operation from a first fixed gear to a second fixed gear.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
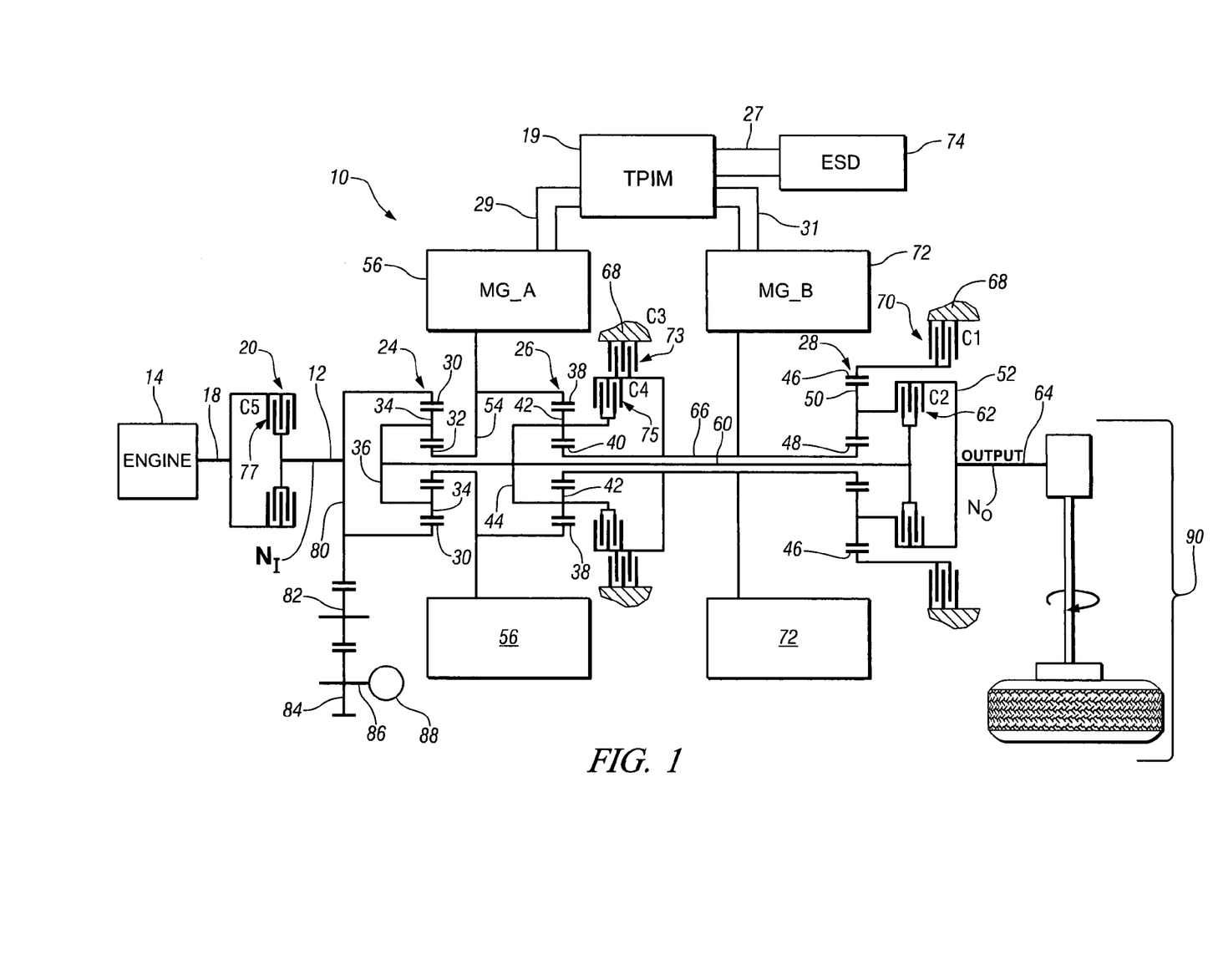
FIG. 1 is a schematic diagram of an exemplary powertrain, in accordance with the present invention.
Figure 2:
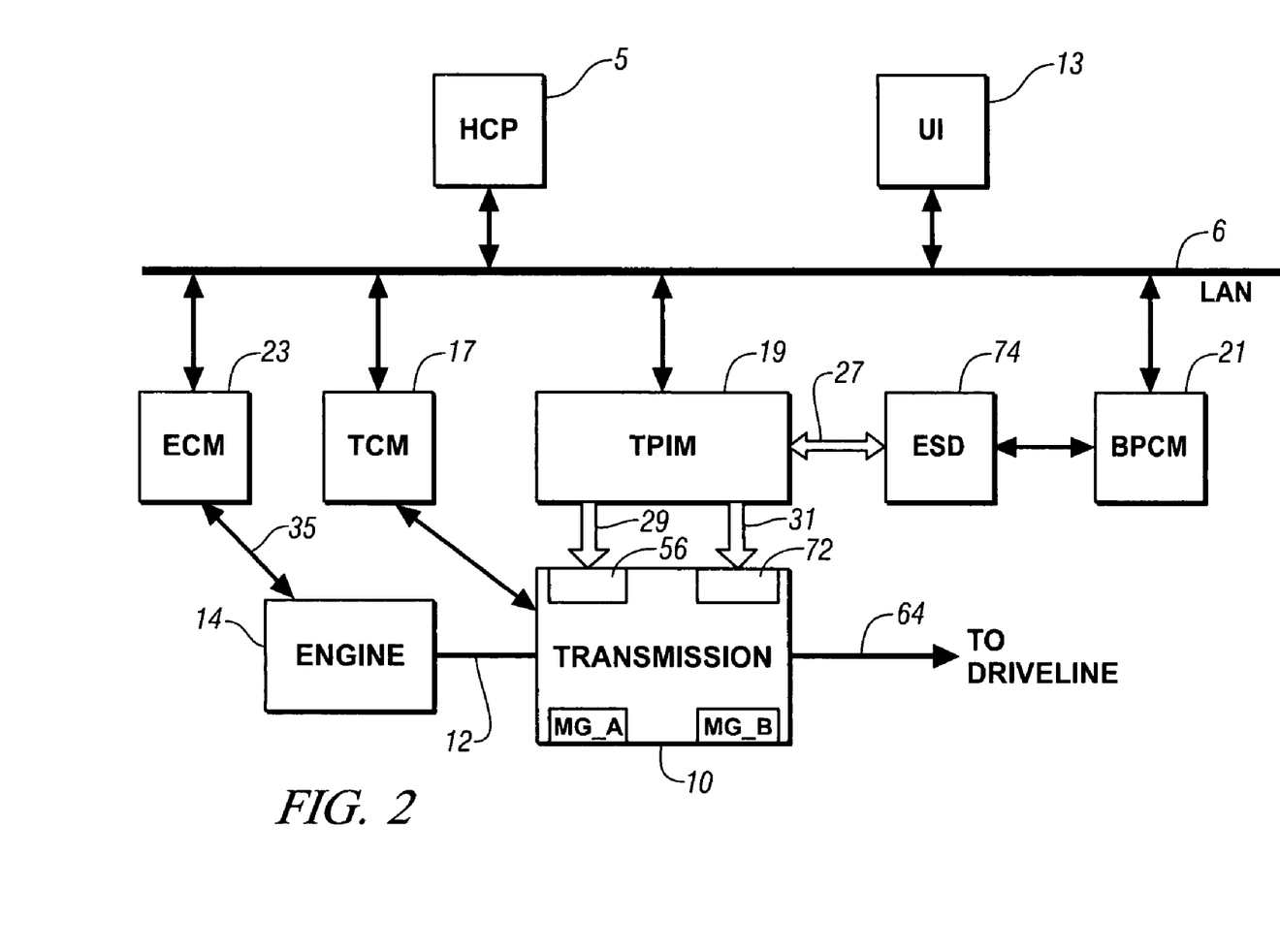
FIG. 2 is a schematic diagram of an exemplary architecture for a control modules for a powertrain, in accordance with the present invention.

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical transmission embodying the concepts of the present invention is depicted in FIG. 1, and is designated generally by the numeral 10. The transmission 10 has an input shaft 12 that is preferably directly driven by engine 14. A transient torque damper 20 is incorporated between the output shaft 18 of the engine 14 and the input member 12 of the transmission 10. The transient torque damper 20 preferably comprises a torque transfer device 77 having characteristics of a damping mechanism and a spring, shown respectively as 78 and 79. The transient torque damper 20 permits selective engagement of the engine 14 with the transmission 10, but it must be understood that the torque transfer device 77 is not utilized to change, or control, the mode in which the transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the transmission 10 utilizes three planetary-gear sets 24, 26 and 28. The first planetary gear set 24 has an outer ring gear member 30 which circumscribes an inner, or sun gear member 32. A plurality of planetary gear members 34 are rotatably mounted on a carrier 36 such that each planetary gear member 34 meshingly engages both the outer gear member 30 and the inner gear member 32.

The second planetary gear set 26 also has an outer ring gear member 38, which circumscribes an inner sun gear member 40. A plurality of planetary gear members 42 are rotatably mounted on a carrier 44 such that each planetary gear 42 meshingly engages both the outer gear member 38 and the inner gear member 40.

The third planetary gear set 28 also has an outer ring gear member 46, which circumscribes an inner sun gear member 48. A plurality of planetary gear members 50 are rotatably mounted on a carrier 52 such that each planetary gear 50 meshingly engages both the outer gear member 46 and the inner gear member 48.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined through a hub plate gear 54 to the outer gear member 38 of the second planetary gear set 26. The conjoined inner gear member 32 of the first planetary gear set 24 and the outer gear member 38 of the second planetary gear set 26 are connected to a first electrical machine comprising a motor/generator 56, also referred to as "MG-A".

The planetary gear sets 24 and 26 are further compounded in that the carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through a torque transfer device 62 which, as will be hereinafter more fully explained, is employed to assist in the selection of the operational modes of the transmission 10. The carrier 52 of the third planetary gear set 28 is connected directly to the transmission output member 64.

In the embodiment described herein, wherein the transmission 10 is used in a land vehicle, the output member 64 is operably connected to a driveline 90 comprising a gear box or other torque transfer device which provides a torque output to one or more vehicular axles or half-shafts (not shown) which terminate in drive members. The drive members may be either front or rear wheels of the vehicle on which they are employed, or they may be a drive gear of a track vehicle.

The inner gear member 40 of the second planetary gear set 26 is connected to the inner gear member 48 of the third planetary gear set 28, through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the transmission 10. The sleeve shaft 66 is also connected to a second electrical machine comprising a motor/generator 72, referred to as MG-B.

All the planetary gear sets 24, 26 and 28 as well as MG-A and MG-B 56 and 72 are coaxially oriented, as about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72.

A torque transfer device 73 selectively connects the sun gear 40 with ground, i.e., with transmission housing 68. A torque transfer device, i.e. C4 75 is operative as a lock-up clutch, locking planetary gear sets 24, 26, MG-A and MG-B 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump when a corresponding clutch control solenoid is actuated. Hydraulic actuation of each of the clutches is accomplished using a known hydraulic fluid circuit having a plurality of clutch-control solenoids, which is not described in detail herein.

The transmission 10 receives input motive torque from the torque-generative devices, including the engine 14 and the electrical machines 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first electrical machine 56 by transfer conductors 29, and the TPIM 19 similarly communicates with the second electrical machine 72 by transfer conductors 31. Electrical current is transferable to or from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC lines and provides AC current to the respective electrical machine, i.e. MG-A and MG-B, over transfer conductors 29 and 31. In regeneration control, the respective inverter receives AC current from the electrical machine over transfer conductors 29 and 31 and provides current to the DC lines 27. The net DC current provided to or from the inverters determines the charge or discharge operating mode of the electrical energy storage device 74. Preferably, MG-A 56 and MG-B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the electrical machines 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump 88.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain through a request for torque including the transmission 10. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque $T_O$, an engine torque command, clutch torque commands for the various clutches C1, C2, C3, C4 of the transmission 10; and motor torque commands.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual engine torque input to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_I$) to shaft 12 leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The Transmission Power Inverter Module (TPIM) 19 includes a pair of power inverters and motor control modules configured to receive motor control commands and control inverter states therefrom to provide motor drive or regeneration functionality. The TPIM 19 is operable to generate torque commands for MG-A 56 and MG-B 72 based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B respectively, are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine requested transmission output torque, $T_O$ at shaft 64, also referred to as an operator torque request. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio (GR1) | C1 70 | C4 75 |
| Fixed Ratio (GR2) | C1 70 | C2 62 |
| Mode II | C2 62 | |
| Fixed Ratio (GR3) | C2 62 | C4 75 |
| Fixed Ratio (GR4) | C2 62 | C3 73 |

The various transmission operating modes described in the table indicate which of the specific clutches C1, C2, C3, C4 are engaged or actuated for each of the operating modes. Additionally, in various transmission operating modes, MG-A and MG-B may each operate as electrical motors to generate motive torque, or as a generator to generate electrical energy. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the electrical machines 56 and 72, which can be referred to as a continuously variable transmission mode. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of machines MG-A and MG-B 56, 72 are dependent on internal rotation of the mechanism as defined by the clutching and proportional to the input speed, $N_I$, determined or measured at shaft 12. The machines MG-A and MG-B function as motors or generators. They are completely independent of engine to output power flow, thereby enabling both to be motors, both to function as generators, or any combination thereof. This allows, for instance, during operation in Fixed Ratio GR1 that motive power output from the transmission at shaft 64 is provided by power from the engine and power from MG-A and MG-B, through planetary gear set 28 by accepting power from the energy storage device 74.

Figure 3:
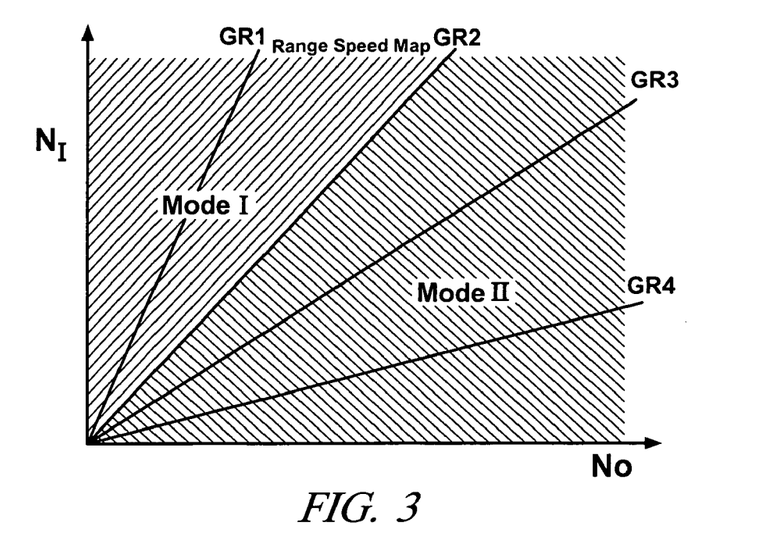
FIG. 3 is an exemplary data graph, in accordance with the present invention; and, FIG. 4 includes exemplary data graphs along a common time line, in accordance with the present invention.

Referring now to FIG. 3, various transmission operating modes are plotted as a function of transmission output speed, $N_O$, and transmission input speed, $N_I$, for the exemplary transmission and control system shown in FIGS. 1 and 2. The Fixed Ratio operation is shown as individual lines for each of the specific gear ratios, GR1, GR2, GR3, and GR4, as described with reference to Table 1, above. The continuously variable Mode operation is shown as ranges of operation for each of Mode I and Mode II. The transmission operating mode is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention.

Selection of the mode of operation of the transmission depends primarily on operator input and the ability of the powertrain to meet that input. Referring again to FIG. 3 and Table 1, a first range falls primarily within mode I operation when clutches C1 70 and C4 75 are engaged. A second range falls within mode I and mode II when clutches C2 62 and C1 70 are engaged. The first fixed gear ratio is available during mode I, when clutches C1 and C4 are engaged. The second fixed gear ratio is available during mode I, when clutches C1 and C2 are engaged. The third fixed ratio range is available during mode II when clutches C2 62 and C4 75 are engaged, and the fourth fixed ratio range is available during mode II when clutches C2 62 and C3 73 are engaged. It should be recognized that the first and second ranges of continuously variable operation for Mode I and Mode II may overlap.

Output of the exemplary powertrain system described hereinabove is constrained due to mechanical and system limitations. The output speed, $N_O$, of the transmission measured at shaft 64 is limited due to limitations of engine output speed and transmission input speed, $N_I$, measured at shaft 12, and speed limitations of the MG-A and MG-B. Output torque of the transmission 64 is similarly limited due to limitations of the engine input torque and input torque measured at shaft 12 after the transient torque damper 20, and torque limitations of MG-A and MG-B 56, 72.

In operation, a shift occurs in the exemplary transmission due to a variety of operating characteristics of the powertrain. There may be a change in demand for an operator demand for torque. Such demands are typically communicated through inputs to the UI 13 as previously described. Additionally, a change in demand for output torque may be predicated on a change in external conditions, including, e.g. changes in road grade, road surface conditions, or wind load. A shift change may be predicated on a change in powertrain torque demand caused by a control module command to change one of the electrical machines between electrical energy generating mode and torque generating mode. A shift change may be predicated on a change in an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and there can be changes in system optimization that compel a shift change in order to optimize system efficiencies to improve fuel economy and manage battery charging. A shift change may be predicated upon a fault in a component or system.

The distributed control architecture acts in concert to determine a need for a change in the transmission operating state, and executes the forgoing to effect the change in gear. A shift change in the exemplary system comprises one of at least three possible situations. There can be a shift from one fixed gear to a second fixed gear. There can be a shift from a fixed gear to one of the continuously variable modes. There can be a shift from one of the continuously variable modes to a fixed gear.

When a shift is from one fixed gear to a second fixed gear, the shift process includes deactivating an off-going clutch, and actuating an oncoming clutch. By way of example, in shifting from GR1 to GR2, off-going clutch C4 75 is deactivated, and oncoming clutch C2 62 is actuated, permitting it to transmit torque. Clutch C1 70 is actuated throughout the process. Actuating an oncoming clutch preferably includes synchronizing the speeds of the elements of the oncoming clutch by controlling the torque-generative devices and, if necessary, controlling slippage of the oncoming clutch. Clutch speed is defined generally as a difference in speed between the elements of the clutch.

A shift change out of any of the fixed gear operating modes can be a multi-step process, wherein torque transmitted across the off-going clutch is preferably off-loaded prior to its deactivation. Offloading torque across the off-going clutch includes adjusting torque-carrying across other torque-transmission paths, e.g. using MG-A or MG-B, and the oncoming clutch. Deactivating an off-going clutch comprises decreasing the torque-carrying capacity of the off-going clutch by reducing hydraulic pressure through control of one of the solenoids, as previously described.

To effect a shift into a fixed gear, torque is off-loaded from the off-going clutch and it is deactivated. An input side of the oncoming clutch is preferably synchronized with the speed of an output of the oncoming clutch and slippage is controlled to minimize heat generation in the oncoming clutch while preventing or reducing driveline jerks and lurches. The oncoming clutch is actuated by controlling hydraulic pressure applied to the clutch to a magnitude sufficient to hold the clutch with zero slip across the clutch elements. Regardless of the type of shift being executed, a shift change takes a finite amount of time to execute, typically targeted for less than one second, and is predicated upon specific circumstances that are monitored and controlled by the control system described hereinabove.

Figure 4:
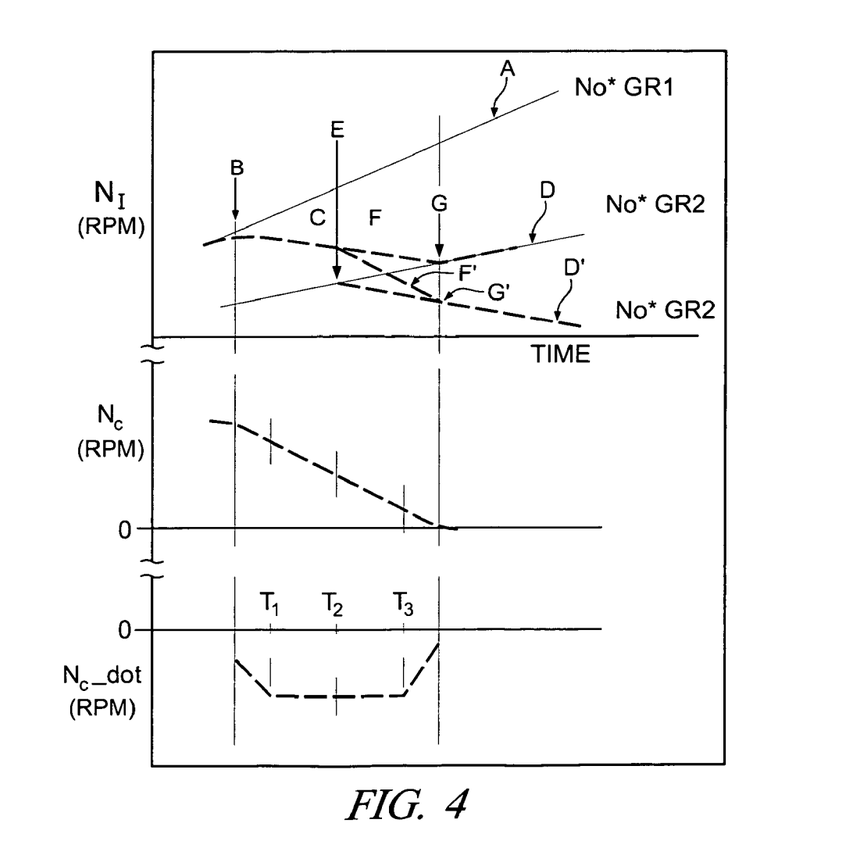

Referring now to FIG. 4, the invention generally comprises an algorithm resident in one of the modules of the control system and executed therein, which acts to implement a method to control operation of the powertrain system, i.e. the transmission 10 and the torque-generative devices 14, 56, 72, during a shift from a first operating mode, preferably one of the fixed gears, to a second operating mode which one of the fixed gears. When a shift is commanded, the control system is operable to determine the specific torque transfer clutch to be off-loaded and deactivated and the specific torque transfer clutch to be actuated, based upon a calibration that contains the substance of the information contained in Table 1, above. The off-going clutch is deactivated, and the transmission enters a speed phase, wherein output of the transmission is determined based upon operation of the electrical machines, MG-A and MG-B. A time-based speed profile for the oncoming clutch established. The output of the transmission, $N_O$, is monitored, and, the input speed, $N_I$, from the engine is controlled based upon the time-based speed profile for the oncoming clutch and the output of the transmission, preferably within a limited elapsed time regardless of a change in output of the transmission. This operation is described in detail herein.

Referring again to FIG. 4, a series of time-related data graphs are shown depicting an exemplary shift from a first fixed gear, in this example GR1, to a second fixed gear, in this example GR2. The first data graph depicts a measure of input speed, $N_I$, plotted as a function of time for the exemplary shifting event. Prior to point B, the transmission is operating in first fixed gear GR1, characterized by actuation of torque-transfer clutches C1 70 and C4 75. At point B, clutch C4 is deactivated, and the transmission operates in continuously variable Mode I, with only clutch C1 actuated, also referred to as a speed phase. At point G, clutch C2 62 is actuated, and the transmission begins operation in second fixed gear GR2, and the speed phase ends. During the speed phase, elements of clutch C2 62 are substantially synchronized to permit actuation of the oncoming clutch C2 without driveline disturbances. The process of synchronizing the elements of clutch C2 62 comprises controlling the input speed $N_I$ according to a predetermined control scheme, described as follows. The input speed $N_I$ determines the speed of the oncoming clutch C2, which yields speed of an element of the oncoming clutch. The speed of the other element of the oncoming clutch is the speed of the carrier 52 of the third planetary gear set 28 directly connected to the transmission output member 64. The speed of the carrier 52 is calculable as being the speed of the output shaft 64, $N_O$, multiplied by the gear ratio, GR2, or $N_O*GR2$. The total elapsed time for executing the shift from the first fixed gear to the second fixed gear is preferably in the range of about 500 milliseconds, from deactivating of the off-going clutch to actuation of the oncoming clutch.

Referring now to the second data-graph of FIG. 4, a graph representative of an exemplary time-based profile for rotational speed of the oncoming clutch $N_C$ during the speed phase is depicted, elements of which are captured as calibration values in the control system. A time-based speed profile, shown as the third data-graph and comprising a change in speed of the oncoming clutch $N_{C\_DOT}$ over the fixed amount of time, is generated therefrom and used to control input speed $N_I$ during the speed phase of the shift. The oncoming clutch is initially operating at a known speed, $N_{C\_INIT}$, determinable based upon the input speed $N_I$ the output speed $N_O$, and the off-going gear ratio. The Y-axis of the graph is a measure of a change in the speed of the oncoming clutch, referred to as $N_{C\_DOT}$. For each initial operating speed $N_{C\_INIT}$ of the oncoming clutch, the operating profile for change in speed of the oncoming clutch $N_{C\_DOT}$ is determined in terms of the transmission output speed $N_O$, over the fixed amount of time.

The operating profile is generated as follows, with reference the third data graph, which depicts a pre-calibrated format for a time-based change in speed of the oncoming clutch $N_{C\_DOT}$, preferably stored in a non-volatile memory device of one of the control modules. The pre-calibrated format for time-based change in speed of the oncoming clutch preferably comprises a three-step format, designated by time-steps T1, T2, and T3, and each time-step is preferably a predetermined percentage of the total elapsed time for a shift. The total time T1+T2+T3 comprises the elapsed time from point B to point G. The first time-step T1 comprises a transition period, wherein there is an initial ramp up in the clutch speed. The second time-step T2 comprises period of steady-state change in speed of the oncoming clutch. The third time-step T3 comprises a ramp down in the speed of the oncoming clutch as synchronization occurs.

Referring again to the data graphs of FIG. 4, in overall operation rotational speed of each of the clutches C1, C2, C3, and C4 is determinable based upon input speed, $N_I$, and output speed $N_O$. The elapsed time to execute the shift is fixed. The format for time-based change in speed of the oncoming clutch $N_{C\_DOT}$ is pre-calibrated, and the desired fixed gear is determined, thus identifying which of the clutches is oncoming. Therefore, at point B, when the off-going clutch is deactivated, one of the control modules is operable to determine initial speed of the oncoming clutch, $N_{C\_INIT}$ and a final speed of the oncoming clutch, which is fixed at zero since clutch speed is calculable based upon relative speed of opposing clutch elements. A specific time-based speed profile for the input speed $N_I$ is generated based upon the pre-calibrated format for time-based change in speed of the oncoming clutch $N_{C\_DOT}$, and the output speed of the transmission, which is measurable. The input speed $N_I$ is controlled by controlling operation of the engine 14 via ECM 23. When the input speed $N_I$ is synchronized with the speed of the output shaft 64, $N_O$, multiplied by the gear ratio, GR2, or $N_O$*GR2, the oncoming clutch is actuated and fixed gear operation begins.

Referring again to FIG. 4, aspects of the speed phase shift execution are described in greater detail. Line element A comprises a showing of input speed, $N_I$, as a function of output speed multiplied by the first gear ratio, GR1, $N_O$*GR1. At time point B, a shift is initiated, with an intent to shift into the second gear, GR2, represented by Line element D. In a first exemplary shift event, Line segments C and F represent input speed, $N_I$, for a shift event wherein there is no change in output speed of the transmission during the speed phase of the shift. At time point G, when the input speed, $N_I$, is synchronized with output speed multiplied by the second gear ratio, $N_O$*GR2, oncoming clutch C2 62 is actuated. From this point forward, the transmission operates in the second fixed gear, GR2. The elapsed time from point B to point G is a fixed amount of time, typically around 500 milliseconds.

In a second exemplary shift event, Line segments C and F' represent input speed, $N_I$, for a shift event wherein there is a change in the output of the transmission during the speed phase. At point E the transmission output $N_O$ changes to $N_O$', further represented by the line segment F'. The control system, which monitors output speed $N_O$, is operable to recalculate the time-based profile for speed of the oncoming clutch, and adjust the engine input speed, $N_I$, to achieve the change in clutch speed to synchronize to the changed output speed $N_O$'. Point G' represents the point in time at which the input speed, $N_I$, synchronizes with the output of the transmission, multiplied by the intervening gear ratio, $N_O$'*GR2. At time point G', when the input speed, $N_I$, is synchronized with output speed multiplied by the second gear ratio, $N_O$'*GR2, oncoming clutch C2 62 is actuated. From this point forward, the transmission operates in the second fixed gear, GR2. The elapsed time from point B to point G' is the aforementioned fixed amount of time, typically around 500 milliseconds.

In operation, rotational speed of the oncoming clutch is preferably synchronized with the transmission output speed multiplied by the oncoming gear ratio, $N_O$*GR2, in order to effect a shift into the oncoming fixed gear without inducing driveline dynamics, e.g. ringing, jerks, and clutch slippage. In the exemplary transmission 10, when the output speed, $N_O$, and oncoming gear ratio are known, the synchronized speed of the oncoming clutch, in this example C2, is calculable based upon the output speed and oncoming gear ratio, i.e. $N_{C2}=N_O$*GR2. The control system controls the input speed, $N_I$, through known engine control algorithms, including subsequent changes in output speed, to synchronize the speed of the oncoming clutch and effect actuation of the clutch in the elapsed amount of time.

It is understood that modifications in the transmission hardware are allowable within the scope of the invention. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for executing a shift between a first fixed gear and a second fixed gear in a powertrain system including an engine connected to an electro-mechanical transmission selectively operative in one of a fixed gear and a continuously variable mode, comprising:
monitoring input speed of an input shaft connecting the engine to the electro-mechanical transmission;
monitoring output speed of an output shaft of the electro-mechanical transmission;
fixing a total elapsed time to execute the shift;
deactivating an off going clutch and operating in the continuously variable mode;
determining an initial speed of an oncoming clutch;
calculating a time-based speed profile for the oncoming clutch;
controlling the input speed of the input shaft based upon the time-based speed profile for the oncoming clutch and the output speed of the output shaft;
determining the speed of the oncoming clutch in accordance with the input speed of the input shaft; and
determining a change in the speed of the oncoming clutch during a fixed total elapsed time and controlling the input speed of the input shaft during the operating in the continuously variable mode;
wherein the time-based speed profile for the oncoming clutch is determined in terms of the output speed of the output shaft over the fixed total elapsed time, comprising a first time step comprising a ramp up in speed of the oncoming clutch, a second time step comprising a steady state change in speed of the oncoming clutch, and a third time step comprising a ramp down in speed of the oncoming clutch as synchronization of the oncoming clutch occurs.

2. The method of claim 1, wherein deactivating the off-going clutch further comprises operating the electro-mechanical transmission in a continuously variable mode to transmit torque to the output shaft.

3. The method of claim 2, wherein operating the electro-mechanical transmission in the continuously variable mode to transmit torque to the output shaft further comprises controlling operation of first and second electrical machines in a speed phase to transmit torque to the electro-mechanical transmission.

4. The method of claim 1, further comprising actuating the oncoming clutch after the fixed total elapsed time.

5. The method of claim 1, further comprising recalculating the time-based speed profile for the input speed of the input shaft based upon the output speed of the output shaft subsequent to deactivating the off-going clutch, and controlling the engine to achieve the recalculated time-based speed profile for the input speed of the input shaft.

6. The method of claim 5, further comprising actuating the oncoming clutch after the fixed total elapsed time.

7. The method of claim 1, wherein the fixed total elapsed time to execute the shift comprises a period of approximately 500 milliseconds from deactivation of the off-going clutch to actuation of the oncoming clutch.

* * * * *